United States Patent Office 2,868,723
Patented Jan. 13, 1959

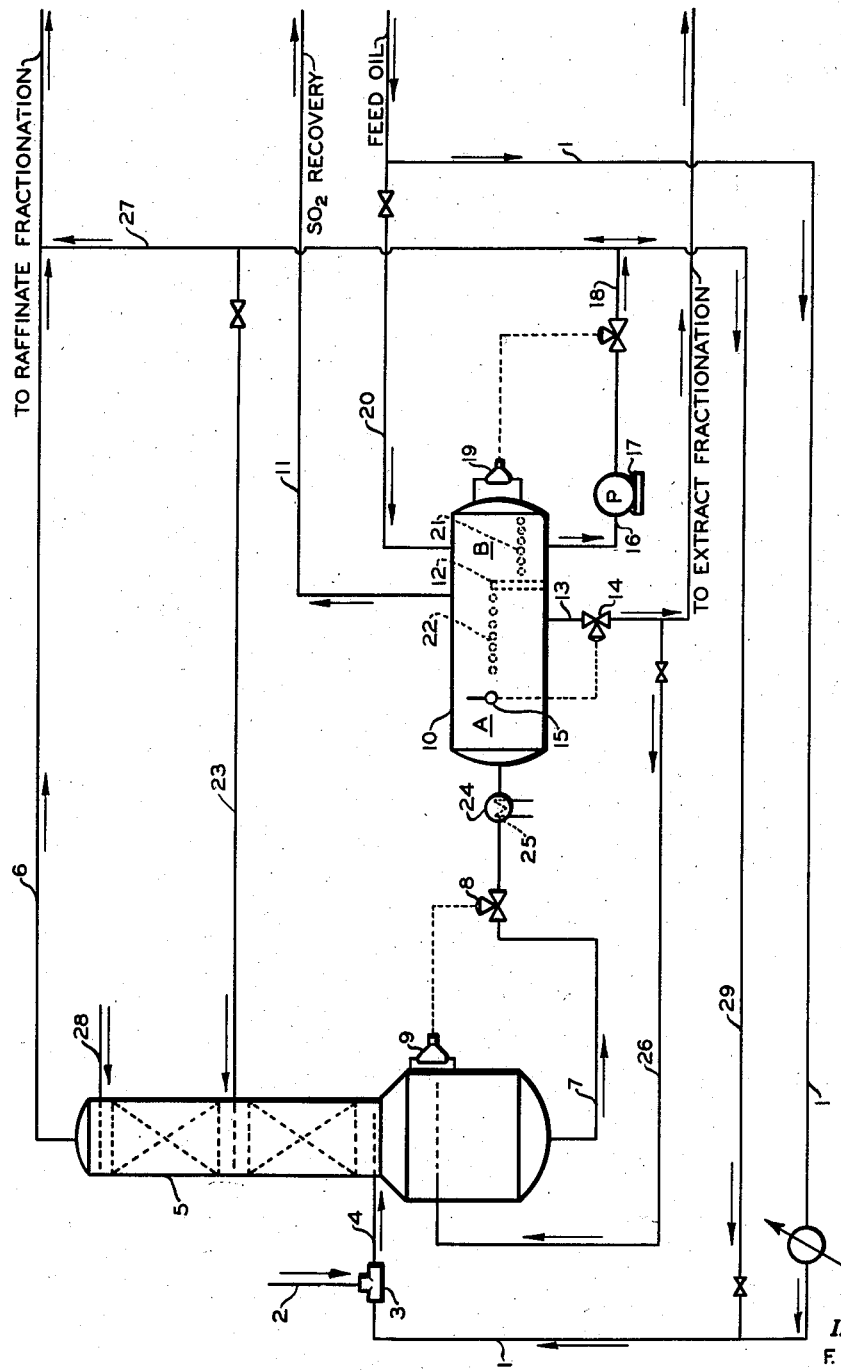

---

2,868,723

SOLVENT EXTRACTION METHOD AND APPARATUS

Forrest E. Gilmore, Bartlesville, Okla., assignor to Phillips Petroleum Company, a corporation of Delaware Application April 2, 1954, Serial No. 420,578

10 Claims. (Cl. 208—320)

This invention relates to solvent extraction. In one of its aspects, the invention relates to the concentration of an extract phase obtained from a solvent extraction operation by subjecting said extract phase to flash evaporation conditions to remove solvent therefrom. In another aspect of the invention, it relates to the flash evaporation of solvent from an extract phase from a solvent extraction operation to sufficiently concentrate and to chill said phase to form or to "spring" therefrom a second raffinate phase. In a still further aspect of the invention, it relates to the springing of a raffinate phase from an extract phase derived from a solvent extraction operation by submitting said extract phase to conditions adapted to evaporate solvent therefrom while maintaining said phase sufficiently quiescent to permit "sprung" raffinate to form and to collect upon the said extract phase. In a still further aspect of the invention, it relates to the separation of a "sprung" raffinate phase layer from above an extract phase layer from which it is formed, as it is formed, by providing within a vessel two sections separated by a weir or partition, on one side of which solvent is evaporated from an extract which is maintained on said side of said partition and from the other side of which partition raffinate is removed as it spills over from the top of said extract layer. Still further, according to the invention, there are provided the step and means for heating raffinate phase in the raffinate-springing and/or the raffinate phase removal side of the said vessel. In a still further aspect of the invention, there are provided a series of vessels as described in which extract phase can be progressively concentrated to recover, as formed, raffinate phases of increasing viscosity at progressively decreasing temperatures and, by virtue of the heating step and means provided, as stated, the ready removal and pumping of "sprung" raffinate readily and easily accomplished.

I have found in the concentation of extract phase derived from a solvent extraction operation, especially when treating wide boiling range oils, that as the solvent is removed and raffinate is sprung from the extract phase the raffinate phase becomes progressively more viscous until crystals are formed therein rendering it difficult to handle. I have further found that if the raffinate phase, sprung from the extract phase by evaporative chilling, is caused to form above the extract phase and is removed from above said extract phase, as phase separation occurs, a raffinate layer is formed and that this raffinate layer can be readily handled before it sets to a mass or otherwise congeals in the apparatus. To this end I have provided an apparatus which consists essentially of a vessel having across its bottom a partition or weir, means for removing solvent vapor from said vessel, means for withdrawing pumpable fluid from each side of said partition, and means for maintaining a level on at least one side of said partition, which level suitably will be approximately at the top of said partition, and will be the extract phase having "sprung" raffinate thereon, as later described. A particularly advantageous point of my invention is in the separation of the "sprung" raffinate by floating it off from the top of the remaining extract phase from which it has been "sprung" by the evaporation of the solvent therefrom. Thus, the raffinate, even through it is quite viscous and even may contain crystals which would be difficult to handle in an apparatus involving internals, such as stirring equipment or coils, can be floated off the remaining extract. Once the raffinate has been thus neatly separated, it can be heated, if desired, before it is pumped or otherwise removed from the vessel. Thus, in one embodiment, the said vessel comprises a heating means at least on that side of the partition which does not necessarily possess an interface control means, that is, on the raffinate collection and removal side of the weir. Further, if the raffinate on the extract side of the weir is at a temperature below that desired to be maintained for it to be desirably floatable from the top of the extract phase, or pumpable, it can be heated by providing a heating means or means for introducing heat to it on the extract side of the weir or partition, as later described.

Thus, according to one concept of this invention, there is provided a method for concentrating a substance in the extract phase obtained from a solvent extraction operation which comprises chilling said extract phase by evaporating solvent therefrom in an amount sufficient to cause a formation of a second raffinate phase and a concentrated extract phase. According to another concept of the invention, there is provided an apparatus, as described, which lends itself to the separation of raffinate phase, as it is formed above an extract phase, the apparatus comprising means for maintaining a body of extract phase in a substantially quiescent state while solvent evaporation therefrom is completed, means for maintaining a desired level of said extract phase in said apparatus, the said means being constructed and arranged so that raffinate layer formed upon the layer of extract phase will flow off from the top of said extract phase and means for collecting and withdrawing said raffinate phase, substantially as formed, from said apparatus. Means to heat the raffinate can be provided, as later more fully set forth and described.

In the drawing there is illustrated diagrammatically a solvent extraction operation in which the various aspects and features of the invention have been embodied.

The embodiment of the drawing is one in which a hydrocarbon oil containing aromatic and non-aromatic constituents is subjected to a solvent extraction operation employing sulfur dioxide as a solvent. Although the invention is specifically illustrated by reference to an embodiment relating to the solvent extraction of aromatics from a hydrocarbon oil containing the same, it will be understood by one in possession of this disclosure that the invention has other applications, for example, in the solvent extraction and subsequent extract concentration of compounds contained in organic reaction mixtures in which the said compounds have been formed, the said compounds being even of such character that they can be solids at extraction concentration temperature.

Referring now to the drawing, a charge oil in liquid phase in conduit 1 and sulfur dioxide in liquid phase in conduit 2 are admixed in jet mixer 3 and conveyed through conduit 4 into packed column extractor 5. Raffinate phase containing some sulfur dioxide is passed by way of conduit 6 to a raffinate fractionation, not shown. Extract phase, rich in sulfur dioxide, is passed by way of conduit 7 equipped with valve 8 controlled by interface controller 9 and with expansion valve 24 into flash tank 10 which in this embodiment is operated at atmospheric pressure. Sulfur dioxide vapor which is formed and removed from the extract phase, introduced into tank 10 by way of conduit 7 and control valve 8, is removed from tank 10 by way of conduit 11 to a gas compressor (not shown) for recompression and reuse. A weir or dam 12 divides vessel 10 into two sections; a flashing section A and a "sprung" raffinate collecting section B. The height of weir 12 is fixed, or if adjustable, so adjusted as to permit maintaining in flashing section A a substantially quiescent layer of extract from which solvent is being flashed or evaporated. Extract from which solvent has been flashed and from which raffinate has been sprung is passed by way of conduit 13, controlled by valve 14, which in turn is controlled by interface controller 15, to an extract recovery, not shown, for removal of any remaining sulfur dioxide from the extract phase. The extract recovery can be a system incorporating a vessel like vessel 10 as later described and discussed. In vessel 10, "sprung" raffinate overflows dam or weir 12 into raffinate collecting section B. When the raffinate is readily pumpable, it is withdrawn from section B by way of conduit 16, pump 17, and valved conduit 18, controlled by liquid level controller 19, and passed through conduits 27 and 6 to raffinate fractionation, not shown. If desired, liquid level controller 19 can be dispensed with and a low level of raffinate can be maintained in collecting section B. Also, if desired, the raffinate can be heated by means of heating coil 21 to render it more pumpable. When the raffinate is not pumpable as, for example, when it contains large wax crystals or a high concentration of wax, it will be heated by means of a heating fluid passed through heating coil 21. Heating coil 21 can be dispensed with according to one embodiment of this invention, and in its place there can be introduced a portion of the feed at a suitable temperature which, of course, can be the temperature at which the feed has been supplied to the unit. When feed is used to supply heat to section B it can be pumped by way of valved conduit 20. The temperature of the feed can be adjusted, say cooled somewhat, before it is introduced into section B, if its temperature is undesirably high. When the feed is introduced into section B to supply heat thereto, its temperature is not necessarily adjusted before it is introduced but, indeed, the cooling it will undergo in section B is relied upon to adjust its temperature for its treatment in extractor 5. Thus, the feed, or at least a portion of the feed, can be employed to heat the raffinate in section B and then some or all of the material withdrawn from section B can be and is passed by way of conduits 18, 29, 1, mixer 3 and conduit 4 to extractor 5.

When it is desired to alter the temperature of the raffinate in section A, feed or other material at a desirable temperature is passed through heat exchange coil 22, preferably located in section A in the raffinate phase only, as shown in the drawing. Ordinarily, the raffinate will be heated by coil 22, especially when it is difficult to flow over the weir. In some instances, however, it may be desirable to cool further the raffinate phase when it has been formed or as it is formed. Thus, with certain waxy raffinates it may be desirable to recover directly from the vessel 10 a solid material and to this end, chilling of the raffinate in addition to that accomplished by the evaporation of solvent can be effected by employing coil 22. When desired, a portion of the feed to the unit can be introduced directly into the raffinate phase in section A. However, since this operation may tend to dissolve some of the raffinate into the extract phase, it is not now preferred.

At least a portion of the raffinate removed from section B can be returned to extractor 5 by way of conduits 16, 18 and 23, especially when the raffinate is considerably more paraffinic than the feed material, as will be understood by those skilled in the art.

Returning to expansion valve 24, it is noted that this valve is placed in close proximity to vessel 10 to avoid springing raffinate in conduit 7 and thereby clogging the same. Heating means 25 are provided on valve 24 to prevent clogging of the valve should this occur. The solvent will begin flashing from the extract as it passes through valve 24 and flashing will be completed in section A, as described. It is within the scope of the invention to position valve 24 within vessel 10 and even to replace this valve with a spray nozzle or other expansion apparatus.

A portion of the chilled extract is recycled by pump, not shown, through conduit 26 to extractor 5 when it is desired to reflux the same.

Additional solvent can be introduced into extractor 5 at an upper portion thereof through conduit 28. About 25–75 percent of the solvent is introduced by each of conduits 2 and 28 when split introduction of solvent is employed.

The solvents which can be employed are sulfur dioxide and other solvents known in the art which will be lower boiling than the oil charged to enable a sufficient separation of solvent from the oil in the extract and the raffinate phases. Preferably the solvent will have a narrower boiling range, if any, than the oil charged.

It will be noted that tank 10 provides very simple yet highly efficient means for immediately separating "sprung" raffinate from extract phase and for handling the said raffinate regardless of its physical condition.

It is within the scope of the invention to pass the extract from section A of vessel 10 to a similar section of a vessel, similar to vessel 10, also operated as vessel 10 is operated but maintained at a lower pressure than that prevailing in vessel 10. Or, if desired, the said similar vessel can be one in which the extract phase is further cooled without any substantial decrease in pressure.

It is an important feature of this invention to provide the heating coil or coils within a vessel such as vessel 10. Thus, even though the vessel is being generally cooled to or maintained at a low temperature, the relatively small quantity of raffinate phase in the vessel at a given time can be and preferably is maintained at all times at a higher temperature than that prevailing in the remainder of the vessel. Although it may seem that to cool and to heat within the same vessel is to do opposites, one of which defeats the purpose of the other, when consideration is given to the relatively very small quantity of heat introduced compared with the amount of heat removed, it is clear that the operation is feasible from all points of view.

Whether the general cooling in the vessel 10 is accomplished as described in connection with the specific embodiment, i. e., by pressure expansion and evaporation of solvent, or by other means without evaporation of the solvent, it is clear with respect to the feature of heating here discussed that phase separation can be accomplished by cooling by means other than evaporation of solvent and that said heating feature will be applicable in such instances, according to the invention. According to the invention, more than one or two such vessels can be serially employed.

As a feature of this invention, whenever the raffinate sprung in tank 10 is considered insufficiently extracted, i. e., is too aromatic, it is returned to a proper place in vessel 5. Since the raffinate is more paraffinic than the feed, it will be introduced at a point above the feed point to the vessel and preferably will be introduced at a level at which the oil or other material in the upper portion of vessel 5 has approximately the same composition as the introduced raffinate.

It will be understood that the drawing and its description are not intended to include all of the specific details of equipment and procedure which one skilled in the art would provide in the operation of any particular embodiment within the scope of the claims. However, the drawing and its description, read in the light of the remainder of the specification and the appended claims, are considered to set forth the concept and essentials of the invention and its severally described features.

In a specific operation according to the invention, all of the raffinate in conduit 16 is returned to extractor 5 by way of pump 17 and conduits 18 and 23 and ultimately leaves the system by way of conduit 6. In this example, none of the extract is returned to extractor 5.

1000 barrels of feed comprised of 18.7 volume percent decant oil and 81.3 volume percent heavy cycle oil from a catalytic cracking operation is charged at 100° F. through conduit 4 along with 250 barrels of liquid $SO_2$ at 80° F. (entering via conduit 2). 750 barrels of liquid $SO_2$ at 100° F. are introduced via conduit 28. This results in a solvent to oil ratio of 1.0 to 1.0.

The 1000 barrels of feed had the following characteristics:

| | |
|---|---|
| BMCI (Bureau of Mines Correlation Index) | 46.4 |
| API at 60° F | 24.7 |
| Pour point, ° F | +80 |
| Initial boiling point, ° F | 516 |
| 50% evaporation at, ° F | 722 |
| 95% evaporation at, ° F | 853 |

Operating conditions:
  (a) Extractor 5—
    Top pressure, p. s. i. g. _____ 90
    Top temperature, ° F _____ 95
    Bottom temperature, ° F _____ 80
  (b) Flash tank 10—
    Temperature, ° F _____ 40
    Pressure, p. s. i. g. _____ 15

Stream compositions:
  (a) Raffinate 6—
    Oil, 700 bbls _____ percent__ 87.5
    $SO_2$, 100 bbls _____ do____ 12.5
    Oil data—
      BMCI _____ 22.0
      API @ 60° F _____ 35.8
  (b) Raffinate 16—recycled to 5—
    Oil, 30 bbls _____ percent__ 75.0
    $SO_2$, 10 bbls _____ do____ 25.0
    Oil data—
      BMCI _____ 26.0
      API @ 60° F _____ 32.5
  (c) Extract 7—
    Oil, 330 bbls _____ percent__ 26.6
    $SO_2$, 910 bbls _____ do____ 73.4
    Oil data—
      BMCI _____ 98.0
      API @ 60° F _____ 7.1
  (d) Extract 13—no recycle—
    Oil, 300 bbls _____ percent__ 27.5
    $SO_2$, 790 bbls _____ do____ 72.5
    Oil data—
      BMCI _____ 102.0
      API @ 60° F _____ 5.8
  (e) $SO_2$ evaporated 11, 110 bbls. (measured as liquid) _____ percent__ 100

It is noted that raffinate 6 is more paraffinic (less aromatic) than raffinate 16. Their respective BMCI's are 22.0 and 26.0. Therefore, stream 16 is charged to extractor 5 above the feed and below raffinate removal conduit 6 since its paraffinicity lies between that of the feed and raffinate 6.

It is noted that extract 13 is more aromatic than extract 7. Their respective BMCI's are 102.0 and 98.0. All of stream 13 is removed from the process.

It is further noted that while in the example a rather high boiling range oil, 516–853° F. (95% point), was employed, the invention includes within its scope operation employing gasolines, kerosenes, heating distillates, light gas oils, heavy gas oils, light and heavy cycle oils, decant oils, and their mixtures.

Generally the temperature in the extractor will be sufficiently high to prevent any plugging of the facilities by wax and will be low enough to produce the separation of the more aromatic from the less aromatic materials. It will be understood that lighter oils containing less waxy materials can be extracted employing lower operation temperatures than in the case of heavier wax-containing oils. The optimum temperature for ease of operation avoiding plugging, etc. and to produce an extract of the highest aromaticity can be determined by mere routine test for each type of feed. As known in the art, various solvent-to-oil ratios can be employed. The pressure in the tower is maintained sufficiently high to prevent evaporation of the particular solvent employed in the event that it is a readily evaporated solvent at the temperature of operation.

From the foregoing description and example, one skilled in the art in possession of this disclosure will understand that I can operate at temperatures lower in the flash tank 10 than in extractor 5 because of the specific characteristics of the design and operation within flash tank 10. The extract phase from tower 5, as explained, is flashed in tank 10 to lower the temperature therein and to accomplish further separation of less aromatic oil from the more aromatic oil. Such a low temperature could not be employed in tower 5 because plugging thereof would result.

Reasonable variation and modification are possible within the scope of the foregoing disclosure, drawing, and the appended claims to the invention, the essence of which is that a material, for example, hydrocarbon oil, is solvent-extracted with a solvent having a boiling point lower than that of the said oil to obtain an extract phase which is then subjected to a pressure and/or a temperature lower than that prevailing in the solvent extraction step to cause formation of a second extract phase and a second raffinate phase which is separately removed from the second extract phase, more specifiically, in one embodiment, by flashing the first-obtained extract phase and maintaining it quiescent to form a raffinate layer upon an extract layer and floating said raffinate layer from the said extract layer over a weir or partition, thus very readily separating the said raffinate layer from the said extract layer and when said raffinate layer is difficultly pumpable, whether obtained by pressure reduction and evaporation of solvent and/or by temperature reduction without solvent evaporation, heating substantially only the raffinate layer either before and/or after it has passed over said weir to render it more pumpable.

I claim:
1. A method for the solvent extraction of an oil which comprises in a first zone contacting at a certain pressure said oil with a solvent having a boiling point lower than that of the said oil; separating an extract phase from said zone; in a second zone, the lower portion of which is divided into at least two sections, a flashing section and a raffinate collecting section, and wherein in said flashing section there is maintained a level of extract phase formed therein of depth sufficient to cause overflow into said raffinate collecting section of raffinate phase layer as it forms in said flashing section, subjecting said extract phase to a pressure lower than that of said first zone so as to cause quiescent flash evaporation of sufficient of said solvent from said phase to form a second extract phase and a raffinate phase and separately removing said second extract phase and said raffinate phase from said second zone.

2. A method according to claim 1 wherein in the raffinate collecting section the raffinate collecting therein is difficultly pumpable and wherein in said section the temperature of the said raffinate is adjusted to render it more pumpable, by heat exchange means provided in said section.

3. A method according to claim 1 wherein in the flashing section the temperature of the raffinate forming upon the extract phase therein is adjusted by heat exchange means provided in said section within the space normally occupied by said raffinate forming upon said extract phase.

4. A method according to claim 1 in which the raffinate and extract phase layers result from the solvent extraction with sulfur dioxide of a hydrocarbon oil boiling in the approximate range 516 to 853° F. (95% point).

5. In a method of separating a raffinate phase from an extract phase upon which said raffinate phase is forming in a flash evaporation zone, the formation of raffinate phase being caused by evaporation of solvent from said extract phase in said zone, the steps of removing evaporated solvent from said zone, heating said raffinate to a temperature which is higher than that of the extract phase by means provided within the space normally occupied by said raffinate forming upon said extract phase and separately removing raffinate and extract phases from said zone.

6. In a method of separating a raffinate phase from an extract phase upon which said raffinate phase is forming in a flash evaporation zone, said formation of raffinate phase being caused by evaporation of solvent from said extract phase in said zone, the steps of removing evaporated solvent from said zone, cooling said raffinate to a temperature which is lower than that of said extract phase by means provided within the space normally occupied by said raffinate forming upon said extract phase and separately removing raffinate and extract phases from said zone.

7. In a solvent extraction system in which a raffinate layer is being caused to form upon an extract phase layer in a flash evaporation zone by evaporation of solvent from said extract phase and in which the raffinate layer as formed is removed from upon said extract phase layer, the steps of removing evaporated solvent from said zone, providing a heat exchange means within the space normally occupied by said raffinate layer and adjusting the temperature of substantially only said raffinate layer and separately removing raffinate and extract phases from said zone.

8. A method according to claim 7 wherein the temperature of said raffinate layer is increased.

9. A method according to claim 7 wherein the temperature of said raffinate layer is decreased.

10. An apparatus comprising a vessel comprising an enclosed shell; a partition disposed substantially vertically across the bottom of, but not extending to the top of, said partition between the sides thereof dividing said vessel into two sections; a first means for introducing a liquid into one of the sections of said vessel; a second means for withdrawing a liquid from the other section of said vessel; a third means for taking overhead vapors produced in said vessel; a fourth means for withdrawing liquid from said one of the sections of said vessel; and heating means in said other section of the vessel.

References Cited in the file of this patent

UNITED STATES PATENTS

| | | |
|---|---|---|
| 2,064,422 | Fenske et al. | Dec. 15, 1936 |
| 2,084,342 | Houghton | June 22, 1937 |
| 2,110,845 | Whiteley et al. | Mar. 8, 1938 |
| 2,116,188 | Churchill | May 3, 1938 |
| 2,131,205 | Wells et al. | Sept. 27, 1938 |
| 2,149,574 | Brown | Mar. 7, 1939 |
| 2,188,051 | Lantz | Jan. 23, 1940 |
| 2,202,389 | Lewis et al. | May 28, 1940 |
| 2,284,583 | Lewis | May 26, 1942 |
| 2,311,144 | Wickham et al. | Feb. 16, 1943 |
| 2,361,780 | Lewis | Oct. 31, 1944 |
| 2,520,391 | Findlay | Aug. 29, 1950 |
| 2,612,464 | Giachetto et al. | Sept. 30, 1952 |
| 2,679,470 | Kress | May 25, 1954 |
| 2,689,819 | Shelton et al. | Sept. 21, 1954 |
| 2,726,192 | Kieras | Dec. 6, 1955 |